United States Patent
Rossini et al.

(10) Patent No.: US 7,308,854 B2
(45) Date of Patent: Dec. 18, 2007

(54) PRINTING MEMBER PROVIDED WITH IDENTIFICATION MEANS DEFINED BY OR CONNECTABLE TO UPDATEABLE MEANS FOR RECORDING DATA RELATIVE TO THE MEMBER AND USEFUL FOR ITS UTILIZATION

(75) Inventors: Felice Rossini, Milan (IT); Michael Bell, Sugar Hill, GA (US)

(73) Assignee: Erminio Rossini, S.p.A., Milan (IT)

( * ) Notice: Subject to any disclaimer, the term of this patent is extended or adjusted under 35 U.S.C. 154(b) by 360 days.

(21) Appl. No.: 11/043,427

(22) Filed: Jan. 26, 2005

(65) Prior Publication Data

US 2005/0194087 A1 Sep. 8, 2005

Related U.S. Application Data

(60) Provisional application No. 60/564,746, filed on Apr. 23, 2004.

(30) Foreign Application Priority Data

Jan. 27, 2004 (IT) .......................... MI2004A0109

(51) Int. Cl.
*B41F 33/00* (2006.01)
(52) U.S. Cl. ...................................... 101/483; 101/375
(58) Field of Classification Search ..................... None
See application file for complete search history.

(56) References Cited

U.S. PATENT DOCUMENTS

| 4,144,812 | A | | 3/1979 | Julian |
| 4,903,597 | A | | 2/1990 | Hoage et al. |
| 5,048,353 | A | | 9/1991 | Justus |
| 5,323,702 | A | * | 6/1994 | Vrotacoe et al. ............ 101/217 |
| 5,323,704 | A | | 6/1994 | Fraczek |
| 5,735,206 | A | | 4/1998 | Rossini |
| 5,782,181 | A | | 7/1998 | Rossini |
| 5,819,657 | A | | 10/1998 | Rossini |
| 5,983,799 | A | * | 11/1999 | Lane et al. ................. 101/375 |
| 6,110,085 | A | * | 8/2000 | Schloemer et al. ........... 492/59 |

(Continued)

FOREIGN PATENT DOCUMENTS

JP 2001353842 12/2001

OTHER PUBLICATIONS

EP Search Report, EP 04 10 6912, Pending.

(Continued)

*Primary Examiner*—Anthony H Nguyen
(74) *Attorney, Agent, or Firm*—Dority & Manning, P.A.

(57) ABSTRACT

A printing member such as a printing cylinder includes an at least partly metal cylinder, or a sleeve to be mounted on a mandrel rotating about its axis. The printing member comprises a body having a thickness. With the printing member there is associated an activatable signaling device that is connectable to a recording device that is arranged to store data related to at least one characteristic of the printing member or to the use of the printing member. The activatable signaling device can include a transponder such as an RFID.

8 Claims, 6 Drawing Sheets

U.S. PATENT DOCUMENTS

| | | |
|---|---|---|
| 6,688,226 B2 | 2/2004 | Rossini et al. |
| 6,691,614 B2 | 2/2004 | Bell et al. |
| 7,159,654 B2 * | 1/2007 | Ellison et al. ......... 166/250.01 |
| 2002/0056392 A1 | 5/2002 | Sameit et al. |
| 2003/0047097 A1 * | 3/2003 | Dzierzynski et al. ....... 101/368 |
| 2003/0205155 A1 * | 11/2003 | Sandstrom .................. 101/375 |

OTHER PUBLICATIONS

Texas Instruments, Radio Frequency Identification Systems, Tag-it™ HF-I Transponder Inlay—Square—Copyright 2002.

Texas Instruments, Radio Frequency Identification Systems, Tag-it™ HF-I Transponder Inlay—Rectangle-Large—Copyright 2002.

* cited by examiner

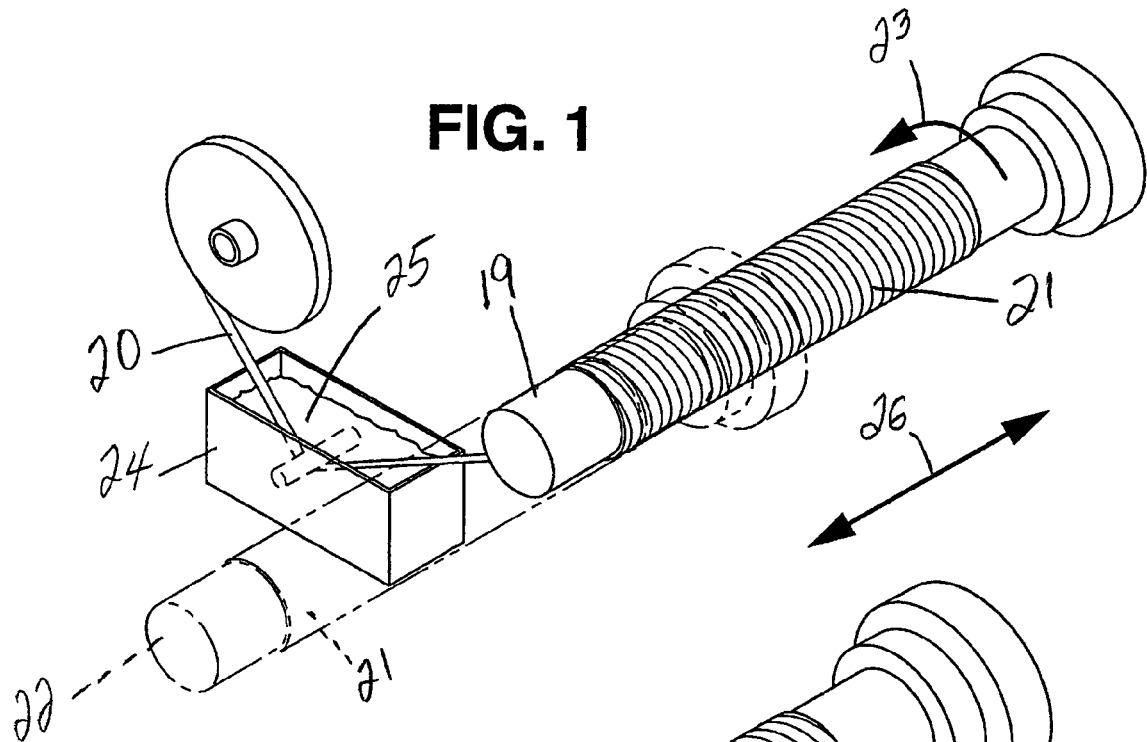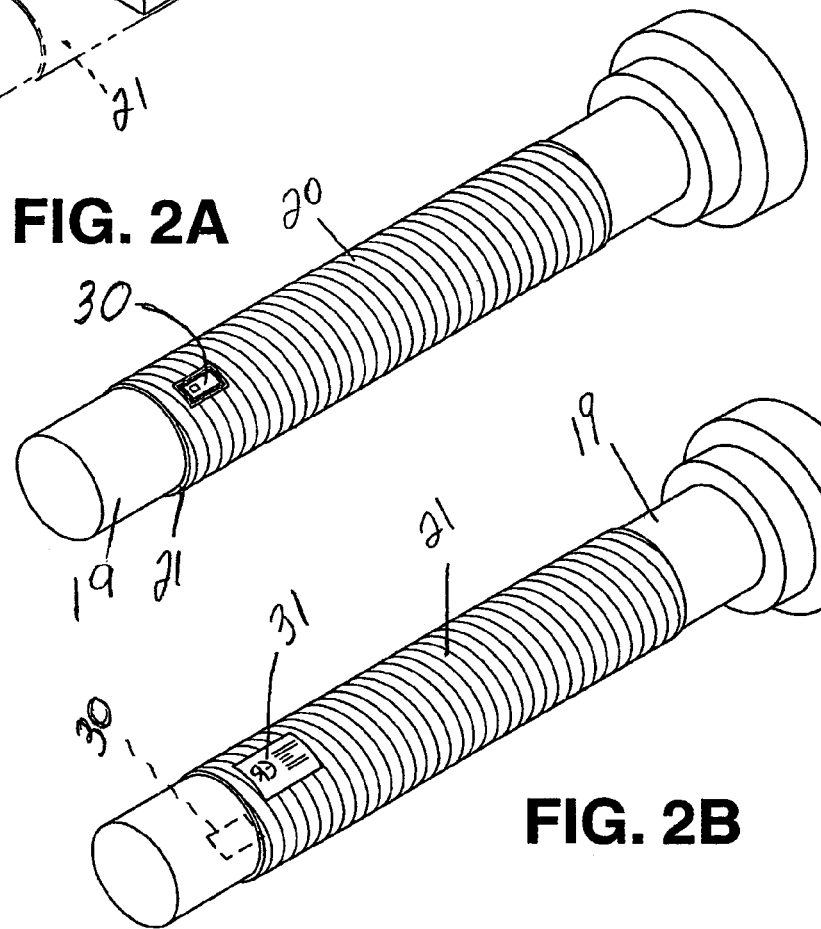

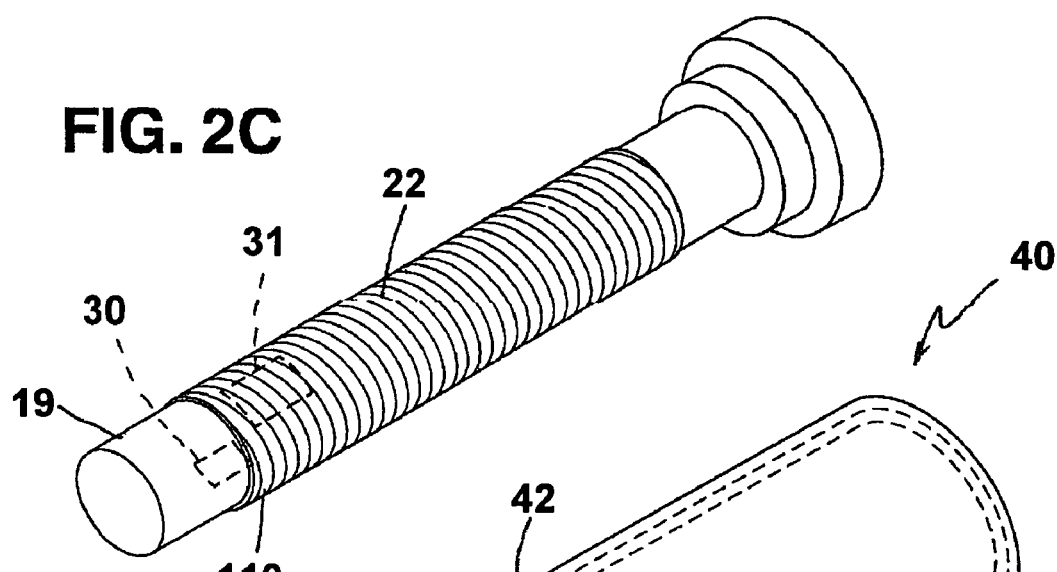
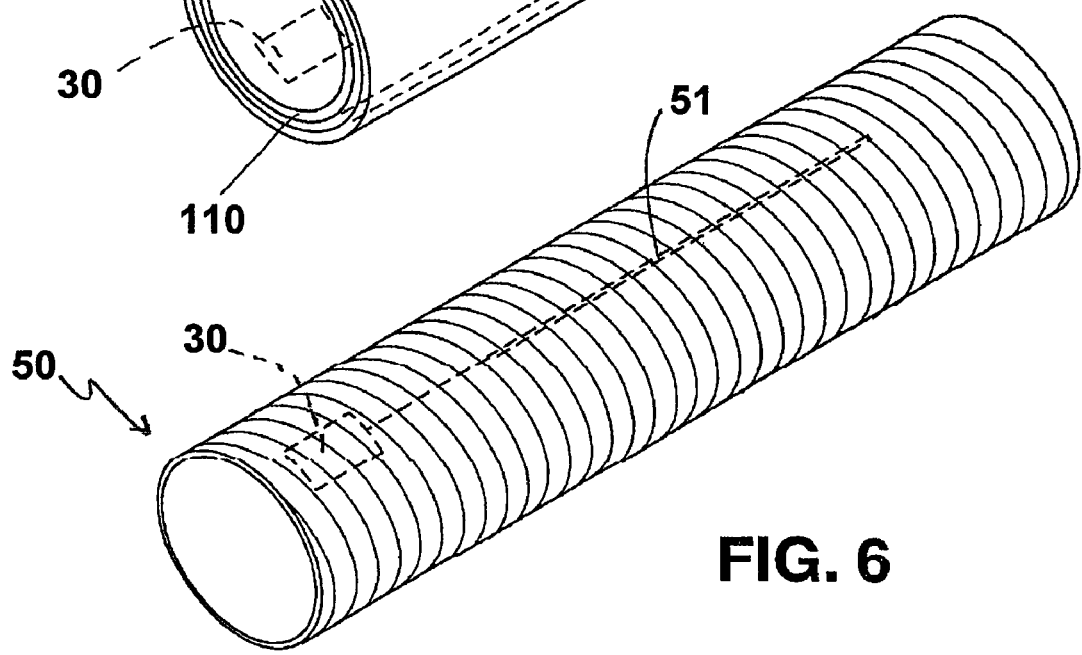

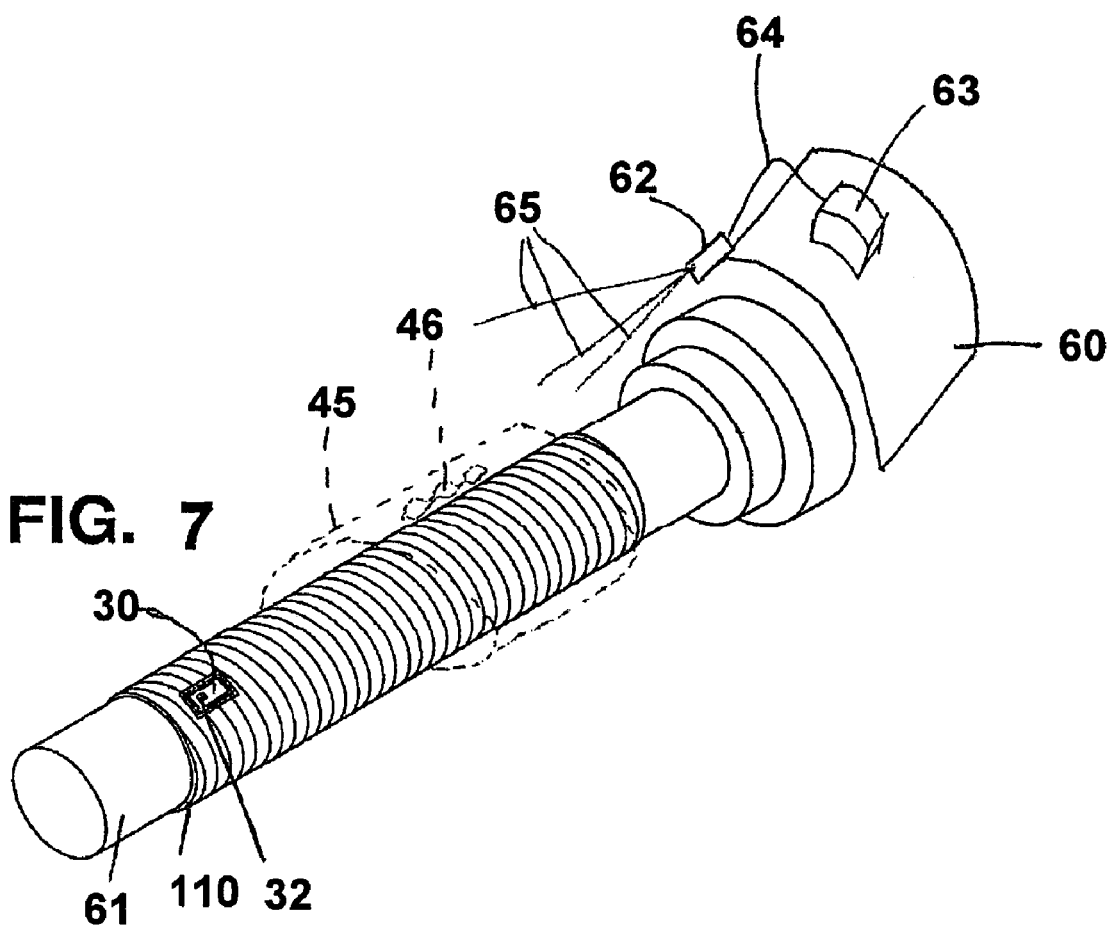

PRINTING MEMBER PROVIDED WITH IDENTIFICATION MEANS DEFINED BY OR CONNECTABLE TO UPDATEABLE MEANS FOR RECORDING DATA RELATIVE TO THE MEMBER AND USEFUL FOR ITS UTILIZATION

CROSS-REFERENCE TO RELATED APPLICATIONS

The present application claims priority to currently pending Italian Patent Application number MI2004A000109, filed Jan. 27, 2004, and to U.S. Provisional Application Ser. No. 60/564,746 filed Apr. 23, 2004.

STATEMENT REGARDING FEDERALLY SPONSORED RESEARCH OR DEVELOPMENT

N/A

BACKGROUND OF THE INVENTION

The term "printing member" as used in the present document means any member for directly or indirectly transferring information onto a miscellaneous support by flexographic, copper-plate or offset printing. Consequently, a printing member comprises any one of the following elements: a printing cylinder in general such as a steel cylinder, a steel cylinder with chromium plated surface, a steel cylinder with rubber cladding, an aluminum cylinder with anodized or non-anodized surface; a printing sleeve to be mounted, in known manner such as by deformation with compressed air or by other means, on a mandrel (possibly of radially deformable type) rotating about its longitudinal axis, said printing sleeve being of composite material such as glass fiber, aramid fiber, carbon fiber or combinations of these fibers, said sleeve of fiber or composite material being clad with a polyurethane or rubber layer or presenting a chromium plated covering surface, or being clad with polyester or epoxy resin; a nickel sleeve unclad, or clad with rubber or polyurethane. Said printing member can present print characters on its outer surface (characters which may be directly formed on it or provided on plates or blocks fixed to said surface in any known manner) to consequently enable direct printing of said characters on a suitable support in a flexographic or copper-plate printing machine; alternatively said printing member can be used as a roller in an intermediate roller group of a flexographic, rotogravure, combining, spreading or offset machine to transfer ink in known manner onto a cylinder provided with said print characters, said roller hence enabling said characters to be indirectly printed on a suitable support.

In printing it has always been a problem for the user to associate with each printing member, information aimed at defining the physical characteristics (for example type, dimensions, characteristics of its constituent material or materials or of those of each cladding layer presented) or related to a previous use and such, for example, as to enable definition of a probable life span or of the need to subject said printing member to a mechanical operation (for example grinding) which would prolong its useful life. In general, this information (particularly if related to the physical characteristics of the printing member) is provided on labels or punchings that are separated from said printing member immediately prior to its initial use or which become illegible after a few uses.

There is therefore a need to provide a printing member, of which the information or data relevant to its use are always accessible to the user even after innumerable uses.

As noted above, a printing sleeve is one form of printing member. Printing sleeves are commonly used in a variety of applications, including flexographic and gravure printing for example. In particular, a printing sleeve that is generally cylindrical in shape can be mounted onto a rotatable printing cylinder of a printing machine for printing images onto a substrate. Most commercial printing machines have numerous printing cylinders and thus require numerous printing sleeves.

A variety of mechanisms can be used to mount the printing sleeve onto the printing cylinder. For instance, "air-mounting" is one common way of mounting a printing sleeve. Air-mounting generally refers to the placement of a printing sleeve onto a printing cylinder by supplying pressurized air between the sleeve and the cylinder. Typically, the printing sleeve has an inner surface diameter that is slightly smaller than the outer surface diameter of the printing cylinder. The difference in these diameters is a dimension known as the "interference fit". Thus, by applying pressurized air, the diameter of at least the inner surface of the printing sleeve can be slightly expanded so that the sleeve can be mounted onto and/or removed from a printing cylinder. Maintaining the integrity of the interference fit is crucial to avoid slippage of the sleeve and resulting smearing or other unacceptable degradation of the image that is printed by the sleeve.

In some instances, an air-mountable printing sleeve can be formed from multiple concentric layers. In particular, most printing jobs involve an "image repeat", which is the circumferential length of the image that is to be printed one or more times on a substrate. The circumference of a printing sleeve must be large enough to contain one or more image repeats. Moreover, different printing jobs may involve image repeats that differ in size, and consequently, different printing jobs may require printing sleeve repeats that also differ in size. For instance, a larger sleeve repeat size requires a printing sleeve with a larger circumferences or outer diameter for the same printing cylinder diameter.

To perform a job that requires a larger sleeve repeat size, the outer surface diameter of the printing sleeve must be large enough to yield the larger sleeve repeat size. Thus, printing sleeves resulting from multiple layers that increase the radial thickness of the sleeve are generally used to provide the necessary radial thickness. Specifically, the multi-layer printing sleeve has the effect of increasing the outer diameter of the sleeve to provide a larger repeat size so that the sleeve can be mounted on a smaller diameter printing cylinder that is already available in inventory. The thicker the sleeves then the greater the inertial mass of the rotating sleeve and the greater the danger of slippage if the interference fit should become compromised during the life of the sleeve.

For example, one type of multi-layered sleeve that is currently used in the art includes an innermost core layer that is formed from wound fiberglass coated with epoxy resin. After a first run of fiberglass tape coated with epoxy resin has been wound around a cylindrically shaped forming mandrel, a paper label having a thickness that is both uniform throughout the label and less than one millimeter is laid on this first run and covered with a second run of fiberglass tape coated with epoxy resin. Such label is provided with information concerning the ultimate sleeve that is to be formed. So typically, the innermost core layer would not be formed until it was known what type of sleeve was going to be built, so that the label could be created with the proper information and then embedded into the sleeve.

Subsequent runs of fiberglass tape coated with epoxy resin are successively wound around the length of the innermost core layer until the desired radial thickness of the innermost core layer has been attained for further processing. This desired radial thickness of this precursor stage of the innermost core layer will be larger than the ultimate desired radial thickness of the innermost core layer. In the further process of forming this innermost core, heat treatments that subject the innermost core layer to temperatures of about 90° C. for about two hours are required. Thereafter, the innermost core layer of this multi-layered sleeve must undergo mechanical grinding and polishing to prepare it for the application of one of the subsequent additional layers that will compose the final multi-layered sleeve. The addition of these subsequent layers typically will also involve heat treatments and mechanical operations of grinding and polishing. Such treatments and operations can subject the sleeve to various expansions, compressions and twisting contortions.

In addition to the innermost core layer, the prior art multi-layered sleeve also can contain one or more layers that add thickness to the sleeve. To form these additional layers, materials such as rigid polyurethane foam or other forms of polyurethane (e.g., ISA-PUR 2330 and ISA-PUR 2340 which are sold by H. B. Fuller Austria, NOMEX® which is sold by DUPONT, and honeycomb structures) are utilized by the prior art sleeve. The thickness of such additional layers can vary depending on the particular image repeat utilized. In addition, other outer layers are also sometimes disposed on the outer surface of these layers, thereby further increasing the inertial mass of the sleeve and placing more importance on maintaining the interference fit of the sleeve.

Gravure and flexographic printing machines can produce images that have multiple different colors. In mounting each printing sleeve on its mandrel of the printing machine for such multi-color printing jobs, it is important that each printing sleeve be mounted in registry with each other printing sleeve so that the final printed image with all of the colors does not have one colored portion of the image bleeding into another colored portion of the image. Registration of each printing sleeve must be achieved not only circumferentially but also axially (side-to-side on the mandrel). In a conventional printing sleeve that carries a printing plate for use in creating an image on a conventional flexographic printing machine or in a conventional printing sleeve that is etched with an image for use in a gravure printing machine, the printing sleeve has a notch in the sleeve. The mandrel has a pin, and the printing sleeve is mounted on the mandrel with the pin surrounded by the notch in the printing sleeve. Registration of each printing sleeve is thus achieved by locating the sleeve's notch relative to the mandrel's pin. The printing machine has an encoder on the servo-drive that indexes each mandrel so that the pin on mandrel points straight up at the 12 o'clock position at the beginning of each printing run of the machine. This is how the registration of the multi-color images is effected with conventional printing sleeves and printing machines.

However, as the sleeve is reused, the notch becomes wallowed out and cannot be reliably located relative to the pin on the mandrel. Indeed, the pin of mandrel can be broken off with careless handling of the sleeves. Each of these conditions of sleeve wear and pin damage renders the conventional manner of registration of the printing sleeve unacceptably inaccurate. Users of the printing sleeve must rely on less efficient methods for achieving the same registration of the sleeve on the mandrel of the printing machine. These less efficient methods can involve wastage of the underlying printing substrate during manual efforts to achieve the desired registration of the multiple color job on the substrate.

OBJECTS AND SUMMARY OF THE INVENTION

An object of the invention is therefore to provide an improved printing member.

Another object is to provide a printing member wherein even after numerous years of use of the printing member, these data or information remain specifically associated with that particular printing member and easily readable.

A further object is to provide a printing member of the stated type that also enables updating of the data relevant to its use, said updating allowing subsequent reading of all information concerning the previously used data regarding said printing member, of all information relative to mechanical operations that may have been carried out on said printing member (for example surface grinding), of all information relative to the wear of said printing member, and of all other information necessary and useful in understanding its reliability and its possible life for further use.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

Two aspects of the present invention are generally directed to a method of making printing sleeves for use in flexographic or gravure printing applications and to the sleeves so made. In particular, a printing sleeve of the present invention can contain an activatable signaling device. The activatable signaling device can be an RF transponder that includes an RFID chip. The activatable signaling device can be or can comprise additional sensor elements, such as those suitable for monitoring the temperature, pressure, and other conditions of a printing member, and such elements may be integrated with or coupled to an RF device so that measurements of a printing member's physical conditions may also be included in the RF signals communicated by an RF device. In a printing sleeve embodiment, the activatable signaling device desirably can be attached to a layer of the sleeve that is composed of a generally rigid and relatively expandable material. For example, the activatable signaling device desirably can be embedded in a layer of the sleeve.

In general, printing sleeves can include a thin-walled sleeve that can stand alone or be used to form the innermost core layer of a multi-layer sleeve. In some embodiments, the thin-walled sleeve or innermost core layer of the printing sleeve desirably can be formed of an expandable, high rigidity material. Some examples of compositions that are suitable for use in the innermost core layer include, but are not limited to, aramid fiber bonded with epoxy resin or polyester resin; reinforced polymeric material such as hardened glass fiber bonded with epoxy resin or polyester resin, the latter two also known as fiberglass reinforced epoxy resin or fiberglass reinforced polyester; DUPONT® MYLAR® or tri-laminate KEVLAR®; carbon-reinforced epoxy resin; and the like. The radial thickness of the innermost core layer can, in some embodiments, be between about 0.020 to about 0.100 inches, with the larger thickness being used for sleeves with greater diameters and/or axial lengths.

In accordance with an aspect of the present invention, a thin-walled sleeve that is formed by winding successive runs of fiberglass tape that has been coated with epoxy resin and wound around a forming mandrel can be provided with an activatable signaling device (such as a radio frequency (RF) transponder). A first run of fiberglass tape that has been coated with epoxy resin is helically wound around the length of a cylindrically shaped, rigid forming mandrel. An RF transponder can be placed on the outer surface of this first layer. Placing the RF transponder atop a second, third, fourth or more successive layers of resin-coated fiberglass tape is also contemplated. Then, in accordance with the process of the present invention, a further layer of resin-coated fiberglass tape is wound around and covers the prior layer of resin-coated fiberglass tape and around the transponder that is disposed on top of the prior layer of resin-coated fiberglass tape. The transponder can thus be disposed beneath at least a second layer of resin-imbued fiberglass tape that forms a thin-walled sleeve (and/or the innermost core of a sleeve) made in accordance with the present invention with but two runs of fiberglass tape. However, additional layers of resin-coated fiberglass tape desirably may be added on top of the run of tape that immediately contacts and overlies the transponder until the desired thickness of resin-coated fiberglass has been attained for the particular sleeve that is desired.

In accordance with an aspect of the present invention, the thickest portion of the activatable signaling device should be less than about one millimeter thick, which is measured in the radial direction when the transponder is positioned on one or more runs of resin-coated fiberglass. In this way, the presence of the activatable signaling device between even the first and second layers of the thin-walled sleeve does not result in any detectable degradation of the performance of the finished thin-walled sleeve. For example, there is no functionally appreciable degradation in the interference fit between the inner surface of the thin-walled sleeve and the exterior surface of the printing cylinder on which the sleeve becomes mounted during operation of the printing machine. Desirably, the thickest portion of the activatable signaling device should be less than about one half millimeter thick.

The RF transponder forming an activatable signaling device in accordance with an aspect of the present invention can include a radio frequency (RF) device, which may in one exemplary embodiment correspond to an RFID transponder (or RFID tag). The RF device may be made up of at least a silicon chip and signaling components for relaying RF signals to a remote location. RF devices in accordance with the present technology may be either active devices, which transmit signals directly to a remote location, or passive devices, which reflect or backscatter transmission from a separate interrogator or reader device. The RF signals relayed by RF device may in some embodiments be characterized by selected frequency levels in the UHF band of 300 MHz to 3000 MHz. Such RF signals may include a variety of predetermined information, including various preprogrammed identification information for a printing sleeve structure, as previously mentioned. A suitable RF device may also include an application-specific integrated circuit (ASIC) for further customizing the identification information available to a user.

Moreover, the multi-layer embodiments of the printing sleeve also can contain one or more additional layers disposed on the outer surface of the innermost core layer that contains the activatable signaling device. The additional layer(s) can be used to add further thickness to the sleeve and/or as a cover layer for the sleeve. In general, any number, size, shape, and/or type of outer layers can be used in the present invention, so long as the resulting printing sleeve can be air-mounted onto a printing cylinder. For example, some suitable materials that can be utilized in forming these additional outer layers include, but are not limited to, aramid fiber bonded with epoxy resin or polyester resin; reinforced polymeric material such as hardened glass fiber bonded with epoxy resin or polyester resin, the latter two also known as fiberglass reinforced epoxy resin or fiberglass reinforced polyester; DUPONT® MYLAR® or tri-laminate KEVLAR®; a polyurethane material (e.g., ISA-PUR 2330 or ISA-PUR 2340 from H. B. Fuller Austria under the tradename ISA-PUR 2330); polyurethane expanded foam; open cell polyurethane foam; polyurethane material having a Shore D hardness from about 75 to about 85; elastomeric rubber materials; elastomeric polyurethane materials; nickel; copper; carbon-reinforced epoxy resin; and the like. In some embodiments, a metal outer layer, such as a layer of extruded aluminum, can also be pressed onto the additional layer(s).

In accordance with a further aspect of the present invention, the activatable signaling device in the thin-walled sleeve provides the possibility of an improved method of effecting the desired registration of the sleeves on a gravure or flexographic printing machine for producing multi-color images on the substrate that is being printed. This improved method is accomplished by providing the printing machine with a positioning scanner and desirably a positioning scanner at each printing station. The positioning scanner is electronically connected to the controller of the printing machine. The positioning scanner detects the precise location of the microprocessor in the transponder and provides this information to the controller of the printing machine. Using this information, the printing machine can index the position of each sleeve so that all of the sleeves are in common registration to produce the desired image on the substrate that is being printed. In this way, all of the colors in the image are in proper registration from the very first image that is printed on the substrate by the machine. The improved method thereby eliminates the wastage of the substrate that occurs during manual registration with conventional sleeves.

Other features and aspects of the present invention are discussed in greater detail below.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

BRIEF DESCRIPTION OF THE DRAWINGS

FIG. 1 schematically presents part of one embodiment of the process of the present invention;

FIG. 2A schematically presents another part of an embodiment of the process of the present invention;

FIG. 2B schematically presents another part of an embodiment of the process of the present invention;

FIG. 2C schematically presents another part of an embodiment of the process of the present invention;

FIG. 3 presents an embodiment of a printing sleeve (with portions cut away and features shown in phantom) made in accordance with one embodiment of the process of the present invention;

FIG. 6 schematically shows components of another embodiment of a sleeve made in accordance with the present invention;

FIG. 7 schematically shows another embodiment of an aspect of the present invention.

DETAILED DESCRIPTION OF THE PREFERRED EMBODIMENTS

Reference now will be made in detail to the invention's presently preferred embodiments, which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

In general, one aspect of the present invention is directed to an improved method of making printing sleeves for use in flexographic or gravure printing and indirect or offset printing and to the sleeves so made.

Figure 2D:
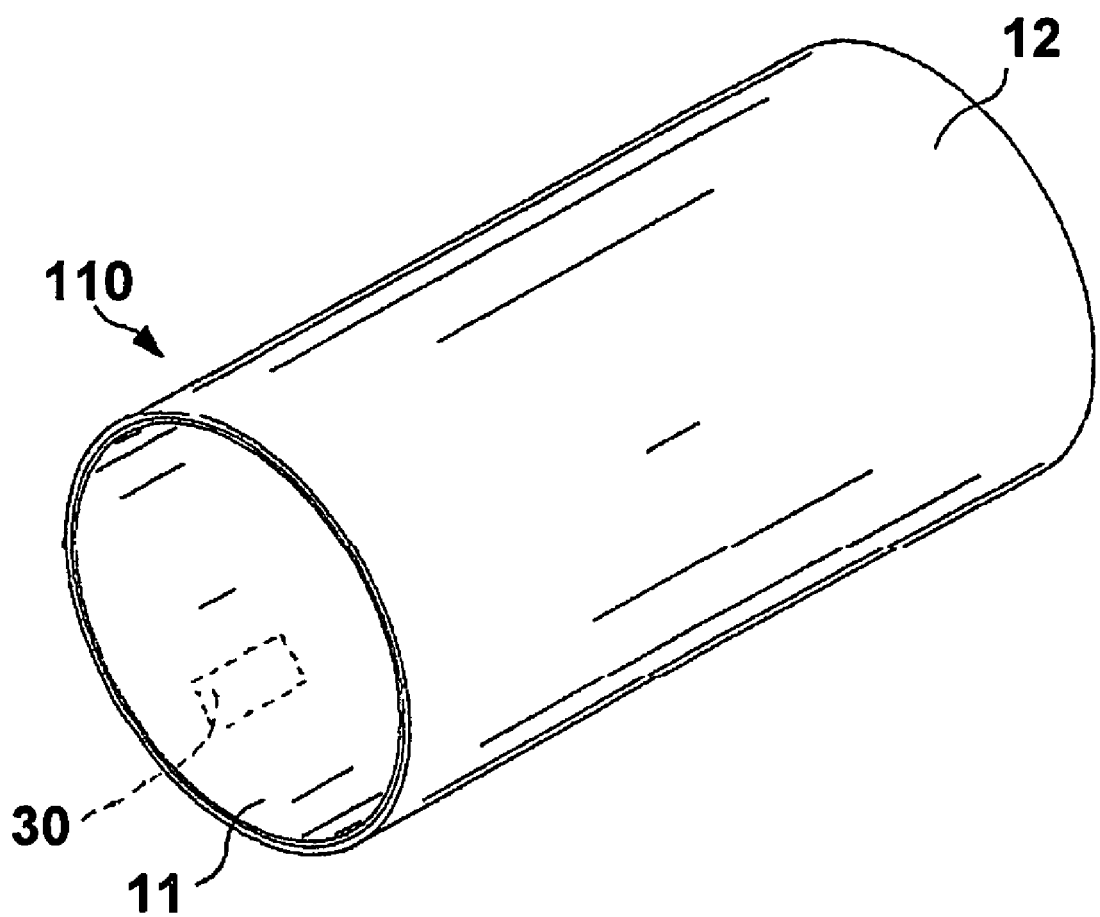
FIG. 2D shows an elevated perspective view of an embodiment of a thin-walled sleeve resulting from the process of the present invention.

Many printing sleeves are based on the formation of a thin-walled substrate that either stands alone as the printing sleeve itself or forms the innermost core layer of a multi-layer printing sleeve. Formation of a thin-walled printing sleeve 110, which also can become the innermost core layer 110 of a multi-layer sleeve, in accordance with the present invention now will be described with reference initially to FIG. 1. For the sake of simplicity, the description will refer to the formation of a stand-alone thin-walled sleeve 110 such as shown in FIG. 2D. But unless otherwise indicated, the description is equally applicable to the formation of an innermost core layer 110 of a multi-layer sleeve 40 such as shown in FIG. 3.

As schematically shown in FIG. 2C, a thin-walled sleeve 110 is formed from wound fiberglass tape that has been coated with epoxy resin and wound around a forming mandrel 19.

In general, any of a variety of materials used in forming printing sleeves can be utilized to form the thin-walled sleeve 110 that also can become a core layer 110. In some embodiments, the thin-walled sleeve (or core layer) 110 is formed of an expandable, high rigidity material. Such materials are expandable so that the thin-walled sleeve 110 can be repeatedly expanded and contracted without adverse consequences. Such non-destructive expansion and contraction permits the inner surface of the sleeve 110 to form an interference fit with the outer surface of a printing cylinder. The degree of permitted expansion and contraction need not be so large as to be detectable by the naked eye.

Some examples of compositions that are suitable for composing the thin-walled sleeve 110 include, but are not limited to, aramid fiber bonded with epoxy resin or polyester resin; reinforced polymeric material such as hardened glass fiber bonded with epoxy resin or polyester resin, the latter two also known as fiberglass reinforced epoxy resin or fiberglass reinforced polyester; DUPONT® MYLAR® or tri-laminate KEVLAR® that may optionally be reinforced with a resin, such as epoxy resin or polyester resin; carbon-reinforced epoxy resin; and the like.

Moreover, the radial thickness of the thin-walled sleeve 110 also can vary, depending on the desired application. For instance, in some embodiments, the thin-walled sleeve 110 can have a thickness between about 0.020 to about 0.100 inches, with the larger thickness being used for sleeves with greater diameters and/or axial length. For example, in one particular embodiment, the thin-walled sleeve 110 is made from wound fiberglass that is coated with epoxy resin having a thickness of 0.040 inches.

In accordance with the present invention and as schematically shown in FIG. 1, a first run 21 of fiberglass tape 20 that has been coated with epoxy resin 25 has been helically wound around the length of a cylindrically shaped, rigid forming mandrel 19 with each successive wrapping positioned so as to slightly overlap the prior adjacent wrapping. The outer surface of the mandrel 19 can be shaped as a right cylinder or can be tapered, depending on the desired shape of the innermost surface of the thin-walled sleeve 110.

As schematically shown by the curved arrow designated 23 in FIG. 1, the forming mandrel 19 is rotated to wind a first layer 21 of fiberglass tape 20 that has been passed through a vessel 24 holding a bath of epoxy resin 25. During the rotation of the mandrel 19, the mandrel is translated back and forth along the axis of rotation of the mandrel. This reciprocating axial translation of the mandrel 19 is schematically indicated in FIG. 1 by the double-headed arrow designated 26 and results in a helical, slightly overlapped winding pattern, with the pitch determined by the speed of rotation and the speed of translation.

A phantom representation of the mandrel 19 covered by the first layer of resin-imbued fiberglass tape 21 is shown by the chain-dashed outline toward the left of the view shown in FIG. 1. The phantom representation illustrates the mandrel 19 at one extreme position of the mandrel's axial translation.

As shown in FIG. 2A, in accordance with one aspect of the process of the present invention, after an initial layer 21 of fiberglass tape 20 has been wound around the mandrel 19, an activatable signaling device (such as a transponder 30) can be placed on the outer surface of this first layer 21 that is to form the thin-walled sleeve 110. Because of the tackiness of the epoxy resin, the activatable signaling device such as transponder 30 will adhere to this outer surface of the first layer 21 of resin-imbued fiberglass tape 20. Alternatively, several additional successive layers of resin-imbued fiberglass tape can be applied after the first layer and before placement of the activatable signaling device, which will be referred to as transponder 30 for the purposes of avoiding undue complication of the remaining explanation.

Then, as shown in FIG. 2C and in accordance with the process of the present invention, a second layer 22 of resin-coated fiberglass tape 20 is wound around and covers the first layer of resin-coated fiberglass tape and around the transponder 30 that is disposed on top of the first layer of resin-coated fiberglass tape. As shown in FIG. 2C, the dashed lines schematically indicate that the transponder 30 is disposed beneath at least a second layer 22 of resin-imbued fiberglass tape that forms a thin-walled sleeve 110 (and/or the innermost core 110 of a sleeve) that is made with only two runs of fiberglass tape 20. Desirably, additional layers of resin-coated fiberglass tape may be added on top of the second run 22 until the desired thickness of resin-coated fiberglass has been attained for the particular application.

In accordance with one aspect of the present invention, the thickest portion of the transponder 30 should be less than about one millimeter thick, which is measured in the radial direction when the transponder 30 is positioned on the first run 21 of resin-coated fiberglass. In this way, the presence of the transponder 30 between even the first and second layers of the thin-walled sleeve 110 does not result in any detectable degradation of the performance of the finished thin-walled sleeve 110. For example, there is no functionally appreciable degradation in the interference fit between the inner surface 11 (FIG. 2D) of the sleeve 110 and the exterior surface of the printing cylinder on which the sleeve becomes mounted during operation of the printing machine. Desirably, the thickest portion of the transponder should be less than about one half millimeter thick.

Figure 4A:
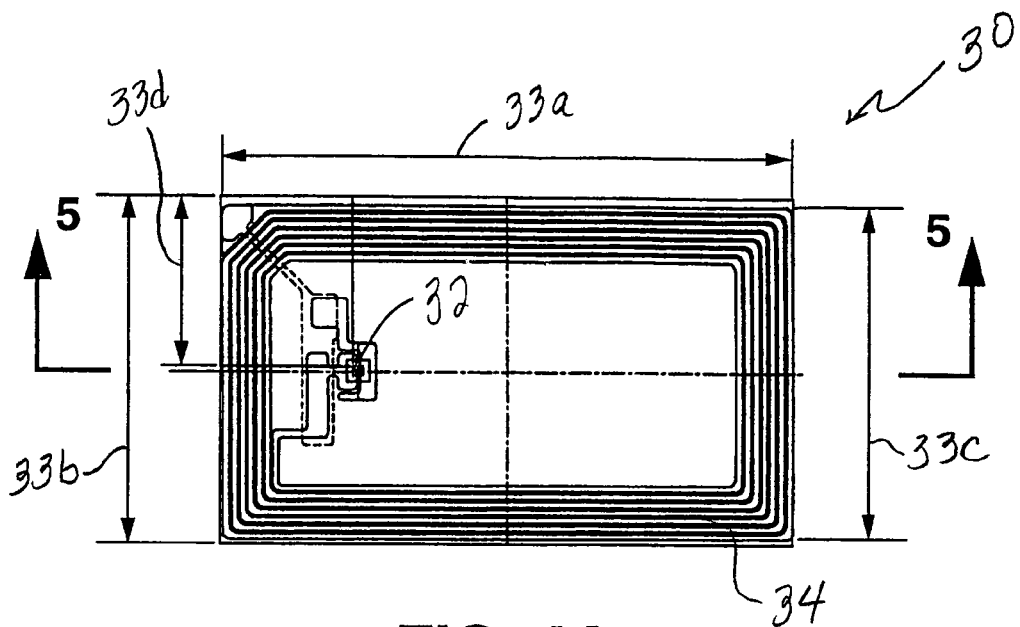
FIG. 4A shows a top plan view of one embodiment of a transponder component suitable for use in an embodiment of the present invention.
Figure 4B:
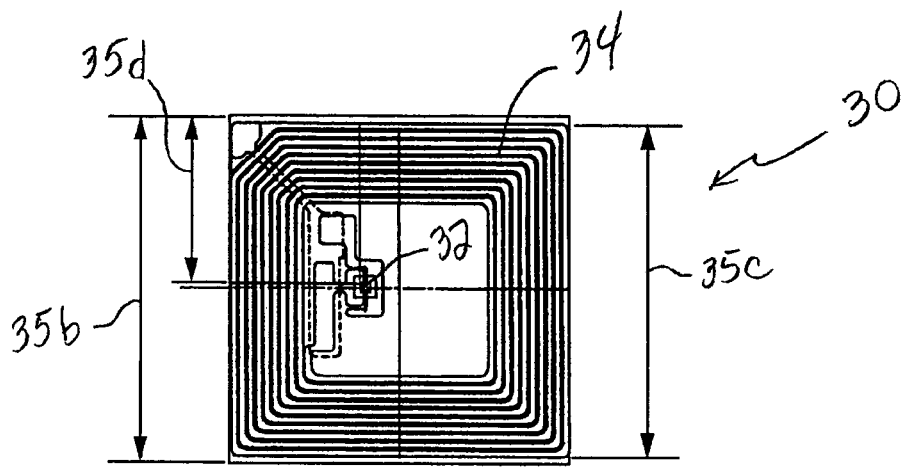
FIG. 4B shows a top plan view of another embodiment of a transponder component that is suitable for use in an embodiment of the present invention.
Figure 5:
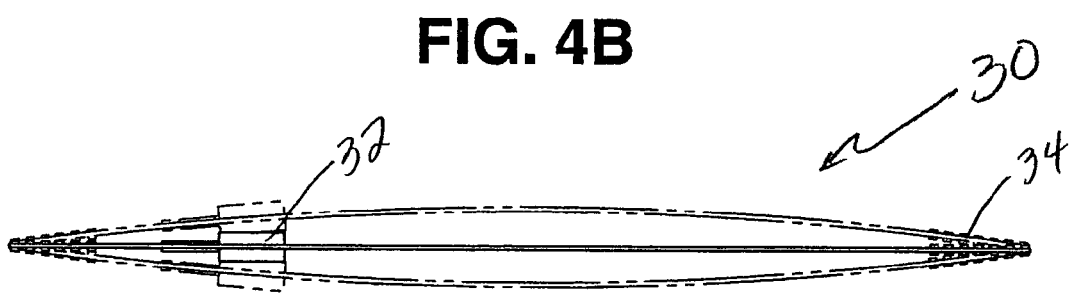
FIG. 5 is the cross-sectional view identified in FIG. 4A by the arrows designated 5-5 and showing in chain-dashed line, bending of the transponder component.

As used herein and shown in FIGS. 4A, 4B and 5, the transponder 30 is part of what are known as Automatic Identification and Data Capture (AIDC) products. Transponder 30 can include a radio frequency (RF) device, which in one exemplary embodiment may correspond to an RFID transponder (or RFID tag), such as a TAG-IT™ HF-I transponder inlay offered for sale by Texas Instruments of Dallas, Tex. As shown in FIGS. 4A, 4B and 5, the RF device may be made up of at least a silicon chip 32 and signaling components for relaying RF signals to a remote location. The silicon chip 32 can include a memory device, which desirably may be a digital memory device.

The RF devices in accordance with one aspect of the present technology may be either active devices, which transmit signals directly to a scanner at a remote location, or passive devices, which reflect or backscatter RF transmission from a separate interrogator or reader device. The transponder 30 can provide location information to a positioning scanner that enables the positioning scanner to determine the position of the transponder relative to the positioning scanner and provide this positioning information to a microprocessor or machine controller of the printing machine. The RF signals relayed by the RF device of transponder 30 may in some embodiments be characterized by selected frequency levels in the UHF band of 300 MHz to 3000 MHz. Such RF signals may include a variety of predetermined information, including various preprogrammed identification information for a sleeve structure, as mentioned below in more detail. The RF device also may desirably include an application-specific integrated circuit (ASIC) for further customizing the identification information available to a user.

Additional sensor elements, such as those suitable for monitoring the temperature, pressure, and other conditions within a sleeve, may be integrated with or coupled to the RF device of the transponder 30 so that measurements of a sleeve's physical conditions also may be included in the RF signals communicated by the RF device.

As schematically indicated by the double-headed arrow designated 33a in FIG. 4A, the length of a generally rectangular-shaped transponder 30 can be about 76 millimeters. As indicated by the double-headed arrow designated 33b in FIG. 4A, the width of such a transponder 30 can be on the order of 48 millimeters. As indicated by the double-headed arrow designated 33c in FIG. 4A, the width of the antenna 34 of the transponder can be on the order of 45 millimeters. As indicated by the double-headed arrow designated 33d in FIG. 4A, the center point of the memory chip 32 of the transponder 30 can be positioned about 23.4 millimeters from the longer side of the transponder. Similarly, the distance of the center point of the memory chip 32 can be disposed about 17.3 millimeters from the shorter side of the transponder 30 depicted in FIG. 4A. This configuration of the transponder 30 is merely exemplary and not intended to be restrictive of the different configurations that could be used in accordance with the present invention.

However, in accordance with the present invention, the transponder's thickness, which is measured in the radial direction when the transponder 30 is positioned on the first run 21 of resin-coated fiberglass, should be less than about one millimeter and more preferably less than about one half millimeter. As shown in FIG. 5, the thickness of the transponder 30 is not uniform throughout the entire transponder. As shown in FIG. 5, the thickness of the transponder's memory chip 32 depicted in FIG. 4A is about 0.355 millimeters, and the thickness of the antenna 34 is about 0.085 millimeters.

The antenna size of this embodiment of the transponder 30 depicted in FIG. 4A can be about 45 millimeters by 76 millimeters. The antenna 34 desirably is formed of a conductive material such as aluminum. The substrate of the transponder desirably can be formed of polyethylenetherephtalate (PET) and thus is flexible to a bending radius that desirably is about eighteen (18) millimeters for the transponder 30 dimensioned as described above.

The memory chip 32 desirably can be provided with a programmable memory that has 2000 bits organized in 64 by 34 bit blocks. The supported standard of the transponder 30 can be ISO 15693-2,-3 with a recommended operating frequency of 13.56 megahertz.

Since the antenna 34 of the transponder 30 surrounds the memory chip 32, it is not important how the antenna 34 is oriented on the surface of the first layer 21 of fiberglass tape imbued with resin.

The transponder 30 has the ability to receive information from the sleeve manufacturer as well as from the client that purchases the sleeve to use on the printing machine. Users of the sleeve find it desirable to write to the transponder 30 such information as how long the sleeve has been run and accordingly the number of feet with each use, the image that was mounted on the sleeve 110, the roll of the printing machine that the sleeve was mounted on, and any other particularities that are characteristic of the sleeve that might help the user save time in mounting the sleeve on the machine and preparing the sleeve for the printing process. Other information that is useful to write to the transponder 30 of the sleeve could include the job on which the sleeve was used and any problems that were encountered during the last usage of the sleeve.

A generally square-shaped transponder 30 is depicted schematically in FIG. 4B and is not uniformly the same thickness throughout the entire transponder, but does not exceed about one half millimeter in thickness at any point in the transponder. As indicated by the double-headed arrow designated 33b in FIG. 4B, the width of such a transponder 30 can be on the order of 48 millimeters, and the length is the same. As indicated by the double-headed arrow designated 33c in FIG. 4B, the width of the antenna 34 of the transponder can be on the order of 45 millimeters. As indicated by the double-headed arrow designated 33d in FIG. 4B, the center point of the memory chip 32 of the transponder 30 can be positioned about 23.4 millimeters from the side of the transponder. Similarly, the distance of the center point of the memory chip can be disposed about 17.3 millimeters from the front of the transponder 30 depicted in FIG. 4B. The substrate of the square-shaped transponder desirably can be formed of polyethylenethephthalate (PET) and thus is flexible to a bending radius that desirably is about eighteen (18) millimeters. Again, this configuration is merely exemplary and not intended to be restrictive of the different configurations that could be used in accordance with the present invention.

Subsequent runs of slightly overlapped fiberglass tape coated with epoxy resin can be successively wound around the length of the mandrel after the second run 22 until the desired radial thickness of the thin-walled sleeve 110 has been attained for further processing. This desired radial thickness of this precursor stage of the thin-walled sleeve 110 will be larger than the ultimate desired radial thickness of the final sleeve 110 or innermost core layer 110. In the further process of forming this thin-walled sleeve 110, heat treatments that subject the sleeve to temperatures of about 90° C. for about two hours are required. Thereafter, the thin-walled sleeve 110 must be finished by undergoing mechanical grinding and polishing. As shown in FIG. 2D, the thin-walled sleeve 110 that results from the process of the present invention can include an RF transponder 30 that will be embedded into the final thin-walled sleeve 110. Moreover, the thin-walled sleeve 110 can also be made in a manner similar to the printing sleeves in U.S. Pat. No. 4,144,812 to Julian or U.S. Pat. No. 4,903,597 to Hoage, et al., which are incorporated herein in their entirety by reference thereto for all purposes.

It is believed that the bending of the transponders 30 during manufacture of the sleeve and during subsequent use of the sleeve will not adversely affect the performance of the transponder. Additionally, it is believed that the heat treatments that must be applied to the sleeve during manufacture of the sleeve also will not degrade the performance of the transponder 30 in the final manufactured sleeve. Moreover, notwithstanding that the thickness of the transponder 30 varies between different locations on the transponder and that the transponder can be disposed only one very thin layer of fiberglass tape removed from the inside surface 11 (see FIG. 2D) of the sleeve 110, there is no functionally appreciable degradation in the interference fit between the inner surface of the sleeve and the exterior surface of the printing cylinder on which the sleeve becomes mounted during operation of the printing machine.

As shown in FIG. 3, a thin-walled sleeve 110 such as shown in FIG. 2D can be used as the innermost core layer 110 of a multi-layered sleeve 40 that can have several additional layers 41, 42, which are schematically indicated by the dashed lines and are shown partially cut away. Though only two additional layers are depicted in FIG. 3, more than two additional layers can be used.

In a multi-layered sleeve 40 such as shown in FIG. 3, the finishing of the innermost core layer 110 such as shown in FIG. 2D will prepare the exterior surface 12 (FIG. 2D) of the innermost core layer 110 for the application of one of the subsequent additional layers (such as layers 41, 42 if only two are involved) that will compose the final multi-layered sleeve 40. The formation of these additional layers also will typically involve heat treatments and mechanical operations of grinding and polishing. Such treatments and operations also can subject the multi-layer sleeve 40 to various expansions, compressions and twisting contortions.

One or more additional layer(s) can be used to add further thickness to the multi-layered sleeve 40 and/or as a cover layer for the sleeve 40. In general, any number, size, shape, and/or type of additional layers can be used in the present invention, so long as the resulting printing sleeve can be air-mounted onto a printing cylinder. In this regard, the following patents are hereby incorporated herein for all purposes by this reference: U.S. Pat. Nos. 5,782,181; 5,735,206; 5,819,657; 6,691,614; and 6,688,226.

One such additional layer can be formed from a generally rigid, relatively expandable material. As used herein, the phrase "rigid" refers to a material having a certain Shore hardness. In some embodiments, for example, the additional layer can be made from a material having a Shore D hardness of about 20 to about 85, and in some embodiments, from about 45 to about 50. In one particular embodiment, for example, the additional layer can contain a polyurethane material having a Shore D hardness between about 45 to about 50. One such polyurethane material may be obtained from H. B. Fuller Austria under the tradename ISA-PUR 2330.

Besides being generally rigid, the additional layer, as stated above, can also be relatively expandable. As used herein, the term "expandable" refers to a material that can expand a certain radial distance upon the application of air at a certain pressure. For example, at air pressures between about 80 to about 90 psi, the printing sleeves typically expand in a radial direction between about 0.0015 to about 0.0045 inches, and in some embodiments, between about 0.0025 to about 0.0035 inches. For example, in one embodiment, a printing sleeve having a diameter less than 7 inches expands, in a radial direction, about 0.0025 inches. Moreover, in another embodiment, a printing sleeve having an inner diameter greater than 7 inches expands, in a radial direction, about 0.0035 inches. The thickness of this additional layer can generally vary. In most embodiments, for example, the thickness of this additional layer is between about 0.125 to about 1.50 inches, and in some embodiments, between about 0.125 inches to about 1.00 inches.

Some suitable materials that can be utilized in forming other additional outer layers include, but are not limited to, aramid fiber bonded with epoxy resin or polyester resin; reinforced polymeric material such as hardened glass fiber bonded with epoxy resin or polyester resin, the latter two also known as fiberglass reinforced epoxy resin or fiberglass reinforced polyester; DUPONT® MYLAR® or tri-laminate KEVLAR®; a polyurethane material (e.g., ISA-PUR 2330 or ISA-PUR 2340 from H. B. Fuller Austria under the tradename ISA-PUR 2330); elastomeric rubber materials; elastomeric polyurethane materials; polyurethane expanded foam; open cell polyurethane foam; nickel; copper; carbon-reinforced epoxy resin; and the like. In some embodiments, a metal outer layer, such as an aluminum extruded layer, can also be included.

As schematically shown in FIG. 6, an alternative embodiment of a sleeve 50 made in accordance with one aspect of the present invention can include an elongated piezoelectric crystal 51 that acts as a transducer that supplies an electrical signal to the memory chip of the transponder 30. During the manufacturing process, the crystal 51 is laid on the first run 21 of fiberglass tape 20 along with the transponder 30. The crystal 51 is electrically connected to the transponder 30, which may be provided with an analog-to-digital converter and a digital-to-analog converter, either by hardware or software. In this way, the transponder 30 can be used to record for later download and/or transmit in real time, pressures and the type of bending stresses that the sleeve 50 is undergoing during usage. Such information will aid in the diagnosis of any problems with the performance of the sleeve 50 during use on the printing machine. Arrangements like sleeve 50 shown in FIG. 6 also can be used in prototype test sleeves that are built during development of new sleeve products.

In accordance with a further aspect of the present invention, the transponder in the thin-walled sleeve enables an improved method of effecting the desired registration of the sleeves on a gravure or flexographic printing machine for producing multi-color images on the substrate that is being printed. As schematically shown in FIG. 7, a thin-walled sleeve 110 made in accordance with the present invention is mounted on the mandrel 61 of a printing machine that is schematically designated by the numeral 60. The sleeve 110 carries a printing plate 45 shown in phantom (dashed line) with an image 46 that is also shown in phantom.

As schematically shown in FIG. 7, the printing machine 60 is provided with a positioning scanner 62 that is mounted at the printing station of the mandrel 61. A separate positioning scanner 62 can be provided at each printing station of the machine 60. As schematically shown by the line designated 64, the positioning scanner 62 is electronically connected to the controller 63 of the printing machine 60. As schematically shown by the diverging lines designated 65, the positioning scanner 62 detects the precise location of the microprocessor chip 32 in the transponder 30 and provides this information to the controller 63 of the printing machine 60. Using this information, the printing machine 60 can index the position of each sleeve so that all of the sleeves at all of the printing stations of the machine are in common registration to produce the desired image on the substrate that is being printed. In this way, all of the colors in the image are in proper registration from the very first image that is printed on the substrate by the machine. The improved method thereby eliminates the wastage of the substrate that occurs during conventional manual registration of conventional sleeves.

As shown in FIG. 2B, after an initial layer 21 of fiberglass tape 20 has been wound around the mandrel 19, a label 31 can be placed on the outer surface of this first layer 21 that is to form the final thin-walled sleeve 110. The label 31, which desirably is formed of paper that carries data expressed in ink markings, also can be covered with a second run of fiberglass tape coated with epoxy resin. Thus, the label 31 also can be embedded within the thin-walled sleeve 110 as the different layers of fiberglass tape are wound around the prior layers of fiberglass tape. Indeed, as shown in FIG. 2B, such a label 31 can be disposed between the same two layers that sandwich the transponder 30. Alternatively, such a label 31 can be disposed between different layers than the ones that sandwich the transponder 30. The label 31 can include a machine-readable bar code or information that is readable by the naked human eye and readily comprehensible by the human reader, as desired. Such label has a thickness of less than one millimeter and typically is provided with information concerning the ultimate sleeve that is to be formed.

In accordance with the present invention, because of the presence of the transponder 30 that can receive and store information that can be retrieved subsequently, the innermost core layer 110 of a multi-layer sleeve can be formed before it is known what type of sleeve is going to be built, and the label 31 could be created with generic information that is not particular to any specific customer or type of sleeve or merely provided with a trademark. In an alternative case such as shown in FIG. 2D, the label 31 can be omitted altogether.

The improved method of the present invention also applies to the method of making a sleeve for an indirect or offset printing machine and in particular to an offset blanket cylinder. As is well known, in an offset machine or a lithographic rotary machine with indirect printing and comprising three main cylinders, a second, subsidiary cylinder (or blanket cylinder) receives the inked data to be printed (i.e., "the impression") from a first cylinder and transfers the data to a substrate or web of paper or other material (for example plastic), that is interposed between the blanket cylinder and a third cylinder or pressing (or printing) cylinder. After transforming the inked data to the substrate, the surface of the blanket cylinder passes through a bath of solvents that wash the residual ink from the surface of the blanket cylinder.

Figure 8:
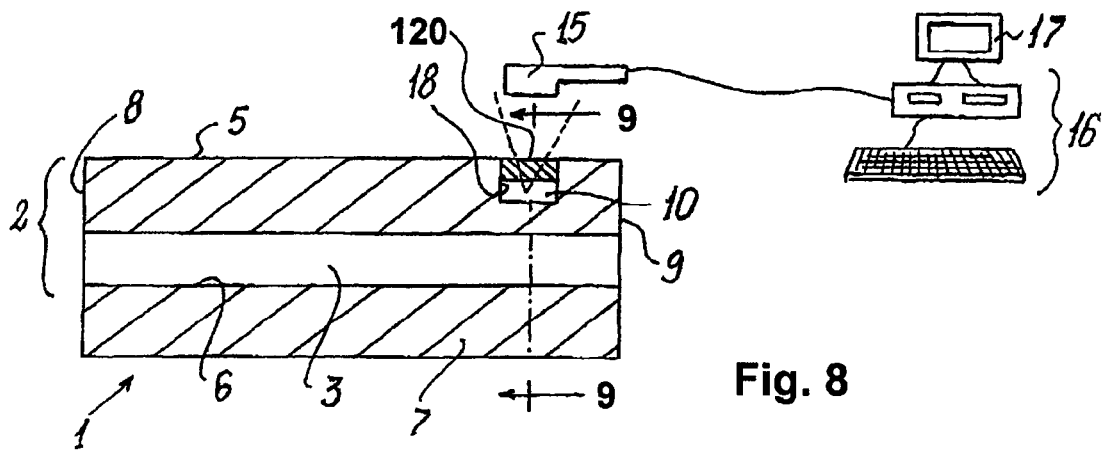
FIG. 8 is a schematic representation that includes a longitudinal side section through a printing member according to an embodiment of the invention.
Figures 9, 10:
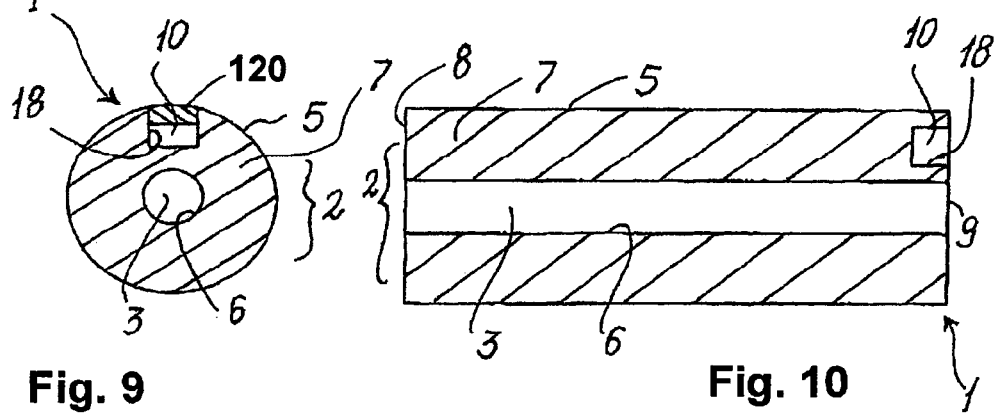
FIG. 9 is a section on the line 9-9 of FIG. 8.
FIG. 10 is a view similar to the longitudinal side section of FIG. 8, but of another embodiment of the invention.

FIGS. 8 and 9 show a printing member defined by a printing cylinder 1 (roller or printing sleeve), for example of metal. Said cylinder 1 comprises a body 2 having a longitudinal through hole 3 enabling the cylinder 1 to be arranged, in the manner known to the ordinary skilled artisan and hence not described, on a known rotary support, for example of the radially expandable type, not shown. As shown in FIGS. 8-10, the body 2 can be of single layer type, i.e., it consists of a single metal, plastic or composite material (in that case, including binding resin).

The body 2 presents an outer surface 5 (carrying the print characters) distant from an inner wall 6 (bounding the through hole 3), between which there is a thickness 7. Finally, the body 2 presents opposing end faces 8 and 9 perpendicular to the surfaces 5 and 6.

In the embodiment of the invention under examination, associated with the printing member defined by the cylinder 1 there is an activatable signaling device 10 that is configured for identifying useful data related to at least one characteristic of the printing member (in this example, a cylinder) and to a physical value of this printing member (for example, dimensions, characteristics of the constituent material of the cylinder 1, type of cylinder, etc.) or to a previous use of the printing member (for example, the hours of previous use of cylinder 1) or to a previous mechanical machining operation to which the printing member has been subjected after its construction and, for example, after one or more uses. Preferably, the data stored in the activatable signaling device 10 comprise a unique absolute code which, when displayed or transmitted remotely (by radio frequency), allows access (via suitable reading instruments defined hereinafter) to a plurality of the aforestated characteristics. One or more characteristics of the cylinder 1 is/are identified via said activatable signaling device, said activatable signaling device consequently defining means for identifying the cylinder.

More specifically, as shown in FIG. 8 for example, the activatable signaling device 10 cooperates operationally with a remote recording means that is updatable after each use of the printing member and is able to store data relating to at least one characteristic of the printing member useful for use of the printing member. As shown in FIG. 8, the remote recording means comprises a microprocessor unit 16 powered from outside the cylinder 1 when the data stored in it are to be read. This power can be supplied to the activatable signaling device 10 from outside the cylinder 1 and without contact with the device itself. For this purpose, the device is desirably of the known radio frequency identification system type and comprises a microprocessor unit in which the data identifying the cylinder 1 are stored and can also be read remotely by a radio frequency reading member 15 (of known type). This radio frequency reading member 15 can be connected to a processor 16 (acting as recording means) by which the read data can be displayed (by monitor 17) to a user and possibly recorded on a suitable storage device (for example a compact disc—CD). The processor 16 can store information relative to the characteristics of the printing member or cylinder 1 and/or relative to dimensional and/or machining modifications that the cylinder has undergone. Consequently, the memory content of the recording means 16 can be updated by the user according to the user's own requirements: for example, by feeding data into the recording means 16 relative to the life of the printing member, grinding and/or wear data or any other data considered opportune by the user to facilitate the use of the printing member.

In the example under examination, the activatable signaling device 10 can be inserted into a seat 18 provided within the thickness 7 of the body 2 and, in the case of FIGS. 8 and 9, covered by a suitable closure element 120. A suitable closure element 120 can be of material of the same type as the constituent material of the body 2 or can be of composite material (for example glass fiber when the body 2 is of metal).

Figure 11:
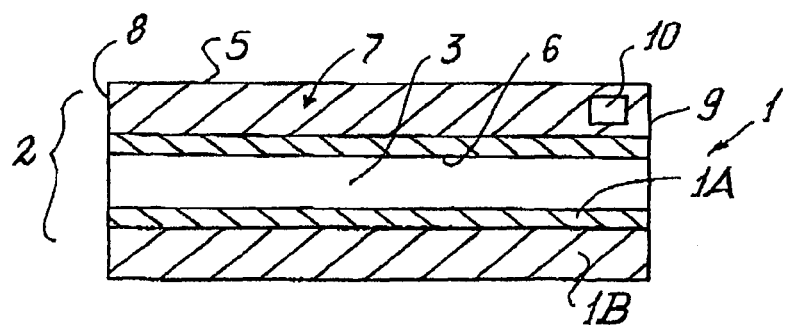
FIG. 11 is a view similar to the longitudinal side section of FIG. 8, but of still another embodiment of the invention.

FIGS. 10 and 11 show variants of the invention. In these FIGS. 10 and 11, parts corresponding to those of the already described FIGS. 8 and 9 are indicated by the same reference numerals.

In particular, FIG. 10 shows a cylinder 1 in which the seat 18 for the activatable signaling device 10 is provided in proximity to the lateral face 9 of the cylinder 1. The activatable signaling device is hence located within the cylinder.

The activatable signaling device 10 shown in FIG. 10 also can have the thickness of a label and be positioned directly on the face 9.

It should be noted that the position of the activatable signaling device 10 shown in FIG. 10 does not negatively affect the use of the printing member, nor can said activatable signaling device be damaged by this use because is it positioned on a side of said member that is not subjected to impacts or stresses during said use.

In contrast, in FIG. 11 the cylinder 1 comprises, in known manner, two layers 1A and 1B, which are torsionally rigid with each other and are defined by different materials (for example one layer 1A is of glass fiber and relative binder, such as epoxy resin, while the other layer 1B is of polyurethane). In this case, the activatable signaling device 10 shown in FIG. 11 can be directly embedded in the polyurethane and is in a position such as to be identified by an indicator visible on the surface 5 of the cylinder in order to enable the embedded activatable signaling device to be easily located.

The layers of the cylinder 1 can also be more than two or the cylinder 1 can be a single layer or multi-layer support for a plate-carrying sleeve which is mounted (for example by compressed air deformation) on the surface 5 of the cylinder 1 (for example provided with through holes between the surfaces 5 and 6 to feed compressed air from the hole 3 to the surface 5 and hence mount said sleeve on it).

By using the microprocessor containing a unique code for each cylinder, this code can be inserted into the body 2 of said cylinder, the code also being able to be read remotely via the reader 15.

In a further variation, the activatable signaling device 10 can also be associated with the exterior or interior of the cylinder 1 (for example on a lateral face 8 or 9 or in the hole 3 on the wall 6) instead of being inserted into its thickness 7. This variation is also to be considered as falling with in the scope of the present invention.

In still a further variation, the recording means or processor 16 cooperates with separate unique identification members of the cylinder 1 defined by at least one code (alphanumerical, bar or other) associated with an outer surface, preferably with a lateral face 8 or 9, of the body 2. On reading this code (visually or by a suitable reader, for example by an optical reader), the unique identification members associated with the print member can be fed into the processor 16 and act on its memory to insert data concerning the cylinder and related to its use. Said memory already contains the cylinder data provided by the manufacturer, namely, the dimensional, body material and other data. In this way, these data can hence be updated by the user.

More particularly, in the variation that is under examination, each cylinder 1 (roller or sleeve) produced is identified by a label for example with a bar code, positioned on the face 8 or 9 of the body 2.

A unique absolute code corresponding to the part serial number can be reproduced on the activatable signaling device.

In accordance with the present invention, a file carrying all the production and technological characteristics of the individual print member can be provided on a computer storage device, associated with each code (stored in the microprocessor unit or carried by the activatable signaling device). This file can be updated each time the user acquires a new sleeve or roller, in order to create a complete database for the equipment available.

When the user uses the equipment, all the technical data of the roller or sleeve can be obtained by reading the code, updating the production runs and production times and any other information considered necessary and useful to file; a search can be made through the rollers/sleeves on the basis of production runs or working times or of any other parameter considered significant.

Although various embodiments of the invention have been described using specific terms, devices, and methods, such description is for illustrative purposes only. The words used are words of description rather than of limitation. It is to be understood that changes and variations may be made by those of ordinary skill in the art without departing from the spirit or scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein. While at least one presently preferred embodiment of the invention has been described using specific terms, such description is for illustrative purposes only, and it is to be understood that changes and variations may be made without departing from the spirit or scope of the following claims.

What is claimed is:

1. A method of embedding an RF assembly during formation of a printing sleeve, comprising:
   a) dipping fiberglass tape in a resin bath;
   b) starting near a first end of a cylindrical mandrel, winding the dipped tape in a helical fashion around the cylindrical mandrel a predetermined number of times to form a predetermined number of layers of the dipped tape covering the mandrel for a first predetermined length;
   c) laying an activatable signaling device on the predetermined number of layers of the dipped tape that covers the mandrel;
   d) winding the dipped tape in a helical fashion around the cylindrical mandrel until a further layer of the dipped tape covers the activatable signaling device and covers a second predetermined length of the predetermined number of layers.

2. A method as defined in claim 1, further comprising applying additional layers of the dipped tape to form a precursor sleeve and thereafter heat treating the precursor sleeve and thereafter finishing the precursor sleeve to form a thin-walled sleeve.

3. A method as defined in claim 2, further comprising forming a multi-layer sleeve by applying at least a first additional layer to the thin-walled sleeve.

4. A method as defined in claim 3, wherein a sensor element is connected to the activatable signaling device before the further layer of dipped tape covers the activatable signaling device and sensor element.

5. A method as defined in claim 4, wherein the activatable signaling device includes an RE transponder and a piezoelectric crystal is connected electrically to the transponder before the further layer of dipped tape covers the transponder and piezoelectric crystal.

6. A method as defined in claim 5, further comprising applying additional layers of the dipped tape to form a precursor sleeve and thereafter heat treating the precursor sleeve and thereafter finishing the precursor sleeve to form a thin-walled sleeve.

7. A method as defined in claim 6, further comprising forming a multi-layer sleeve by applying at least a first additional layer to the thin-walled sleeve.

8. A method as defined in claim 7, further comprising forming a multi-layer sleeve by applying at least a second additional layer to the first additional layer that was applied to the thin-walled sleeve.

* * * * *